Figure 1:
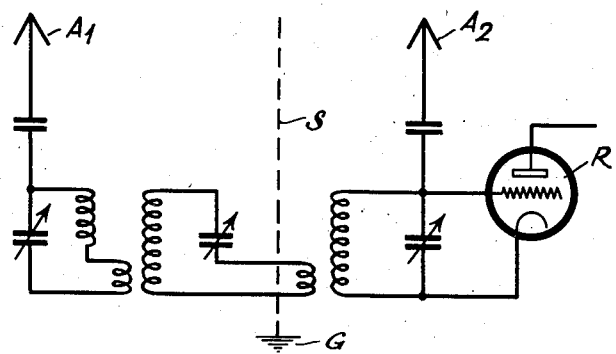

Oct. 7, 1941.                    R. FELD                    2,258,283

DISTURBANCE SUPPRESSION ARRANGEMENT

Filed March 15, 1938

INVENTOR
REINHARD FELD
BY
ATTORNEY

Patented Oct. 7, 1941

2,258,283

UNITED STATES PATENT OFFICE 2,258,283

DISTURBANCE SUPPRESSION ARRANGEMENT

Reinhard Feld, Berlin-Neutempelhof, Germany, assignor to Telefunken Gesellschaft für Drahtlose Telegraphie m. b. H., Berlin, Germany, a corporation of Germany Application March 15, 1938, Serial No. 195,937
In Germany February 22, 1937

2 Claims. (Cl. 250—20)

The basic problem to be solved by the invention is to suppress a stray or disturbing frequency which is so close in value that standard filtering means are unable to eliminate it. When applied to receivers the interfering frequency may be so close that it lies inside the band width of the resonance curve of a normal oscillation circuit.

The invention is predicated upon the fact that the desired or signal frequency and a closely adjacent frequency or wave of disturbing nature are both conveyed or transmitted through different paths. In both these paths the phase rotation is dissimilarly connected with the frequency, and both may be balanced in such a way that for the interfering frequency a phase rotation of 180 degrees is produced, while at the end of the two transmission paths, amplitude equality for the disturbing frequency prevails. The two frequencies conveyed over different paths are then re-united.

When this idea is applied to a receiver, the procedure may be so that one of the transmission paths or routes contains two oscillation circuits more than the other paths, these oscillation circuits being in loose, or preferably in nearly critical, coupling relationship with each other. The disturbing or interfering frequency, and the desired or signal frequency may lie to within 0.05–1 percent together, and yet they may still be separated from each other.

Two exemplified embodiments of the invention are illustrated in the drawing.

Figure 2:
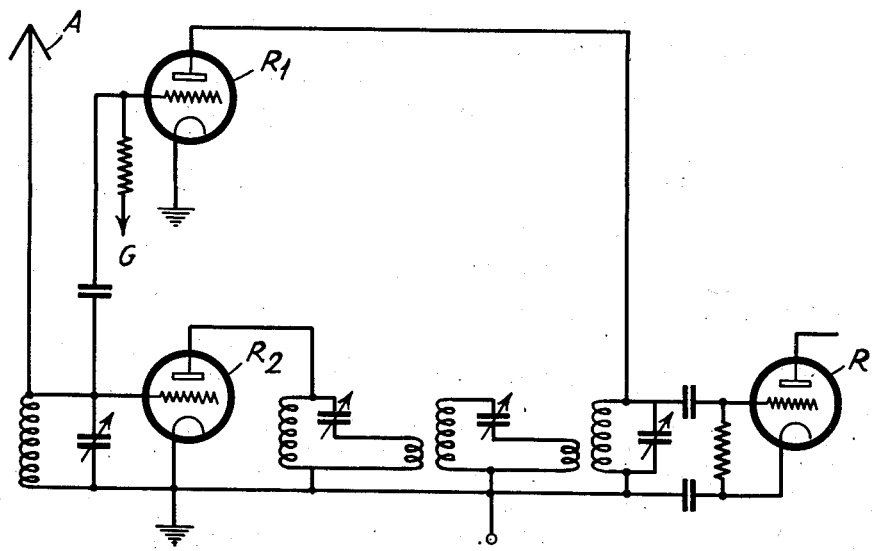

Fig. 1 shows one of these embodiments.
Fig. 2 shows another form of the invention.

Referring to Fig. 1 it will be seen that from the antenna $A_2$ RF voltage is impressed upon the grid of tube R through a single circuit, while the feed from antenna $A_1$ is through three circuits. All of these three circuits are tuned to the disturbing or stray frequency rather than to the signal frequency, and the coupling sense is so chosen that the voltage originating from one of the antennae presents a phase angle of 180 degrees in reference to the potential originating from the other antenna, with the result that, in the presence of equal amplitudes the two potentials will cancel out. What is utilized in this connection is the fact that the potentials of two inter-coupled oscillatory circuits differ 90 degrees in reference to one another for the resonance frequency. Total extinction or suppression, however, does not happen even for such closely neighboring frequencies as still lie inside the total resonance curve of all of the three circuits, even in cases of very loose coupling thereof.

The underlying cause is that for frequencies which differ from the resonance frequency the phase is altered more rapidly than the amplitude. For a single oscillatory circuit the phase shift, in the presence of a percentage detuning equal to ½ of the damping, is already 45 degrees, whereas the amplitude, for the same detuning is only around 0.7 times as much, that is, ½√2. For two circuits the phase shift is already 90 degrees for the same detuning, whereas the amplitude has dropped 0.7×0.7 times or to about one-half. When the two potentials present a 90-degree shift in relation to each other, there is brought about not only no compensation, but, on the contrary, an increase in amplitude to around 1.4 times (reference to like amplitude). Whence it will be seen that even for frequencies which are little adjacent the frequency to be suppressed no attenuation occurs any more.

In practice a limitation is imposed by the accuracy with which tuning of the oscillation circuits (and thus phase shift) and stabilized amplitude equality are possible. The latter may be secured by variation of coupling. The two aerials are preferably shielded in reference to each other in order that the tuning may not be rendered more difficult by spurious couplings. Suitable shielding means for this purpose is shown by the grounded shield S in Figure 1, G representing the ground connection.

It is also feasible to tune the very oscillation circuit connected with the tube to the incoming (signal) frequency. In that case the other two circuits must also be detuned in reference to the stray wave, that is, in such a way that the natural frequency thereof will come to lie between the signal and the stray frequencies in order that suppression of the stray frequency may be accomplishable.

Fig. 2 shows another exemplified embodiment. This scheme comprises in the inputs of the two transmission paths or routes two tubes $R_1$ and $R_2$, though only one aerial A. This circuit organization offers the advantage that balancing is more readily feasible, and that by variation of the grid biasing voltage G of one of the two tubes, amplitude equality is more readily establishable.

The invention distinguishes itself from circuit organizations of the same general nature known in the earlier art because of the fact that it is possible to cut down the amplitudes of stray frequency actually to the zero level. The invention is useful, for instance, for telegraphic reception, and it offers certain merits for recorder reception since it is not possible in this case to insure auditory discrimination by the ear of a closely adjacent frequency.

I claim:

1. In a receiving circuit, means for filtering out an unwanted disturbance frequency which is closely related to the desired frequency comprising a pair of receiving antenna systems for intercepting both the desired energy and the unwanted disturbance frequency, an electronic relay having an input circuit, coupling means including at least three cascaded resonant circuits for electrically connecting one of said antenna systems to the relay input, and coupling means for electrically connecting the other of said antenna systems to said relay input, said last named means comprising at least one of said three resonant circuits, said two coupling means being related so that the first thereof is provided with two more resonant circuits than the second named coupling means, all of said resonant circuits being resonant at the unwanted disturbance frequency.

2. In a signalling system, a pair of antennae arranged so as to pick up substantially similar voltages, means for shielding said antennae from each other, a single utilization device, a reactance network connecting one of said antennae with said utilization device whereby the voltage delivered to said device is a function of frequency, a second network connecting the other of said antennae to said device, said second network being so constituted that the voltage delivered to said device by the second network is a different function of frequency from the first named function, said networks being arranged to deliver to said load equal and opposite voltages at a frequency to be suppressed.

REINHARD FELD.